W. B. GERVAIS.
FUSIBLE WASHER FOR FIREPROOF STRUCTURES.
APPLICATION FILED MAR. 26, 1914.
1,131,925.
Patented Mar. 16, 1915.
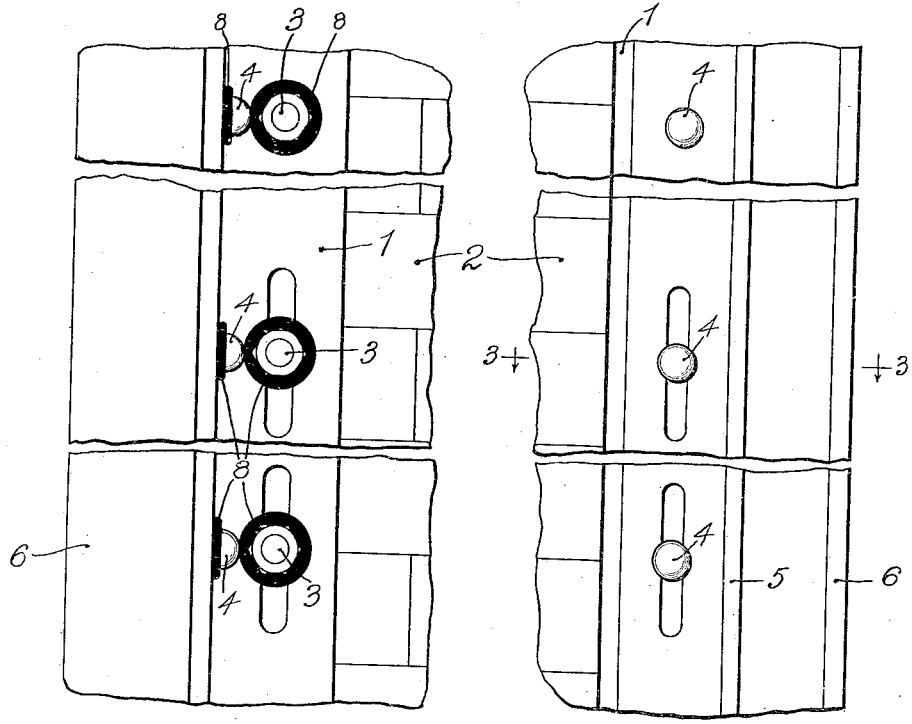
Fig. 1.
Fig. 2.
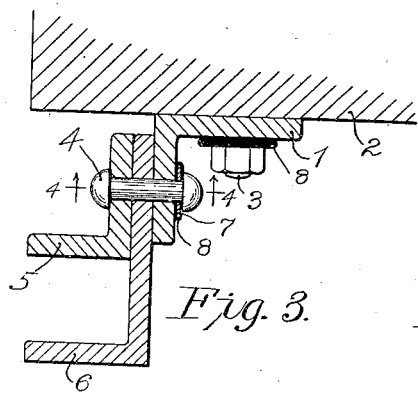
Fig. 3.
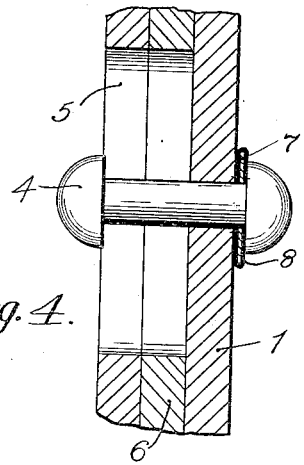
Fig. 4.
Witnesses:
Leonard E. Bogue
Leonard W. Novander
Inventor
Wainwright B. Gervais
By Brown Williams Bell Hanson & Boettcher
Attorneys.

UNITED STATES PATENT OFFICE.

WAINWRIGHT B. GERVAIS, OF CHICAGO, ILLINOIS, ASSIGNOR TO VARIETY MANUFACTURING COMPANY, OF CHICAGO, ILLINOIS, A CORPORATION OF ILLINOIS.

FUSIBLE WASHER FOR FIREPROOF STRUCTURES.

1,131,925.  Specification of Letters Patent.  Patented Mar. 16, 1915.

Application filed March 26, 1914. Serial No. 827,381.

*To all whom it may concern:*

Be it known that I, WAINWRIGHT B. GERVAIS, a citizen of the United States, residing at Chicago, in the county of Cook and State of Illinois, have invented certain new and useful Improvements in Fusible Washers for Fireproof Structures, of which the following is a full, clear, concise, and exact description, reference being had to the accompanying drawings, forming a part of this specification.

The present invention relates to fireproof structures, and more particularly to metallic guideways for fire doors and shutters, and has for its object to provide for the automatic loosening of the several members of the guideway, under the action of abnormal heat due to fire, in order that the guideway may not become choked by the unequal expansion and contraction of the guideway members.

When guideways of the kind under consideration are constructed without provision for permitting movement of one part relatively to another when subjected to high temperature, as for example, when a fire is in progress on one side of a dividing wall through which an opening is formed protected by a fireproof shutter or door, the guideways for the door or shutter are apt to buckle, and thus either interfere with the proper operation of the door or shutter or form an opening between the edge of the door or shutter and the wall through which the fire may pass, or both, and it is to provide against this result that the parts of the guideway are made so they may move relatively to each other when subjected to a dangerous rise in temperature.

My present invention particularly consists in specially preparing washers for use under the heads of rivets or in connection with bolts used to fasten the guideways together, so that the washers, in addition to performing their regular function of affording a bearing surface for the heads of the rivets or the nuts or heads of the bolts, are covered with a layer of readily fusible or disintegrable material which normally results in securely holding parts of the guideway together. The layer of material is thus made, in effect, a part of the washer itself, and does away with the necessity of providing separate devices for use in connection with the bolts or rivets and washers, as is sometimes done when it is desired to construct fastening devices that shall be released by the application of heat. It will be understood that these fastening devices may be employed also for other fireproof structures in connection with which it is desirable to release the parts clamped together for a dangerous rise in temperature.

The several drawings illustrating my invention are as follows:—

Figure 1 is a front elevation of a part of a guideway including washers of my invention; Fig. 2 is a view from the left of the parts shown in Fig. 1; Fig. 3 is a view of the parts shown in Fig. 2 taken along the line 3—3, and Fig. 4 is a view of the parts shown in Fig. 3 taken along the line 4—4.

Similar numerals refer to similar parts throughout the several views.

As shown in Figs. 1, 2 and 3, the guideway consists of an angle-bar 1 secured to a wall 2 by means of bolts 3, the upper one of which extends through a hole in the angle-bar, while the other ones of said bolts extend through vertical slots therein, as indicated. The outstanding leg of the angle-bar 1 has secured to it by rivets 4 the two angle-bars 5 and 6 which are of such size that their outstanding legs form between them a channel guide for the door or shutter with which the guideway is to be used. The upper one of the rivets 4 extends through round holes in the angle-bars 1, 5 and 6, while the others of said rivets extend through slots in the angle-bars 5 and 6 so that when the heat-responsive devices are released the angle-bars may move longitudinally relatively to each other to prevent buckling of the guideway. The rivets 4, as shown in Fig. 4, have disposed under their heads washers 7 which are coated with a layer 8 of material which is readily disintegrable or fusible by a dangerous rise in temperature, as a result of which, although the rivets securely hold the parts of the guideway together normally, when a temperature is applied to the device which is greater than any normal atmospheric temperature, the coating will disintegrate or melt, thus freeing the parts so that they may contract or expand relatively to each other and thus prevent buckling of the guideway. The coating 8 may be of any plastic material which is sufficiently hard under normal temperatures to hold the parts of the guideway in place and which will have a comparatively low melting point, as, for example, asphaltum, pitch, tar, etc., in combination with a suitable solvent or oil and, if desired, some hardening material such as resin, so that the compound may be readily melted by a temperature which it is unsafe to subject to the structure to be protected by the door or shutter and yet which will be hard under normal temperatures. The compound may either be made plastic by means of a solvent so that it may be applied to the washers by painting or by dipping, or the compound may be made plastic and thin by heating the same so that the washers may be coated either by brushing them with the heated compound or by dipping the washers in it. As a result, a compound washer is formed which is at all times provided with its heat-responsive covering, so that the washer, which is preferably of steel, may perform all of its normal functions and in addition constitute the means for automatically releasing the parts of the guideway upon an application of an undue rise of temperature.

It is immaterial how the guideway is constructed as long as it is desirable to release the parts thereof from each other by heat-responsive fastening devices upon the application of a dangerous rise of temperature; and it is also immaterial whether bolts or rivets or their equivalent are used to hold the parts together as long as washers constructed in accordance with my invention are employed as a part of the fastening devices.

What I claim is:

1. A built-up washer for use in fireproof structures consisting of a stable metallic core surrounded by a coating of compound disintegrable by a dangerous rise in temperature.

2. A built-up washer for fireproof structures comprising a steel core coated with a compound of pitch.

In witness whereof, I hereunto subscribe my name this 17th day of March, A. D. 1914.

WAINWRIGHT B. GERVAIS.

Witnesses:
WILLIAM S. MORSE,
MILLARD GILMORE.

Copies of this patent may be obtained for five cents each, by addressing the "Commissioner of Patents, Washington, D. C."